US008372910B2

(12) United States Patent
Abdallah et al.

(10) Patent No.: US 8,372,910 B2
(45) Date of Patent: Feb. 12, 2013

(54) SILICA CONTAINING BLACK SIDEWALL COMPOUNDS AND TIRES COMPRISING SAME

(75) Inventors: David Gary Abdallah, Tallmadge, OH (US); Joseph M Lanzarotta, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 385 days.

(21) Appl. No.: 12/760,200

(22) Filed: Apr. 14, 2010

(65) Prior Publication Data

US 2010/0197847 A1 Aug. 5, 2010

Related U.S. Application Data

(62) Division of application No. 12/343,864, filed on Dec. 24, 2008, now Pat. No. 7,732,522.

(60) Provisional application No. 61/017,280, filed on Dec. 28, 2007.

(51) Int. Cl.
*C08K 3/04* (2006.01)
*C08K 3/34* (2006.01)

(52) U.S. Cl. .......................... 524/495; 524/493

(58) Field of Classification Search .......... 524/495
See application file for complete search history.

(56) References Cited

U.S. PATENT DOCUMENTS

| | | | |
|---|---|---|---|
| 5,202,373 A | 4/1993 | Kawakumi et al. | |
| 5,244,028 A | 9/1993 | Segatta et al. | |
| 5,739,198 A | 4/1998 | Sandstrom et al. | |
| 5,872,171 A | 2/1999 | Detrano | |
| 5,901,766 A | 5/1999 | Sandstrom et al. | |
| 5,929,157 A | 7/1999 | Matsuo | |
| 5,988,248 A | 11/1999 | Sandstrom | |
| 6,046,266 A | 4/2000 | Sandstrom et al. | |
| 6,048,923 A | 4/2000 | Mabry et al. | |
| 6,191,205 B1 | 2/2001 | Micouin et al. | |
| 6,230,773 B1 * | 5/2001 | Sandstrom et al. | 152/517 |
| 6,255,397 B1 | 7/2001 | Sandstrom | |
| 6,279,633 B1 | 8/2001 | Corvasce | |
| 6,523,590 B2 | 2/2003 | Meier et al. | |
| 6,561,243 B2 | 5/2003 | Zanzig et al. | |
| 6,573,324 B1 | 6/2003 | Cohen et al. | |
| 6,670,416 B1 | 12/2003 | Blok et al. | |
| 6,761,198 B2 | 7/2004 | Zanzig et al. | |
| 6,837,288 B2 | 1/2005 | McElrath et al. | |
| 6,838,511 B2 | 1/2005 | Zanzig | |
| 6,939,920 B2 | 9/2005 | Pyle et al. | |
| 6,939,921 B2 | 9/2005 | Waddell et al. | |
| 6,988,523 B2 | 1/2006 | Blok et al. | |
| 7,019,084 B2 | 3/2006 | Sandstrom | |
| 7,387,141 B2 | 6/2008 | Tanno et al. | |
| 7,389,802 B2 | 6/2008 | Kanz et al. | |
| 7,410,222 B2 | 8/2008 | Ikeda et al. | |
| 7,455,092 B2 | 11/2008 | Yukawa et al. | |
| 7,475,713 B2 | 1/2009 | Naito et al. | |
| 7,490,644 B2 | 2/2009 | Yukawa | |
| 7,500,499 B2 | 3/2009 | Tanno | |
| 7,549,452 B2 | 6/2009 | Tanno et al. | |
| 7,556,075 B2 | 7/2009 | Tanno | |
| 7,581,577 B2 | 9/2009 | Tanno | |
| 2004/0192825 A1 | 9/2004 | Zanzig et al. | |
| 2005/0049351 A1 | 3/2005 | D'Sidocky et al. | |
| 2006/0060284 A1 | 3/2006 | Zanzig et al. | |
| 2006/0167173 A1 | 7/2006 | Amino | |
| 2006/0217481 A1 * | 9/2006 | Otsuki | 524/493 |
| 2007/0158007 A1 * | 7/2007 | Hochi | 152/517 |
| 2008/0105346 A1 | 5/2008 | Toyoda | |

FOREIGN PATENT DOCUMENTS

| | | |
|---|---|---|
| CN | 101072692 A | 11/2007 |
| EP | 1033265 | 9/2000 |
| EP | 1193085 | 4/2002 |
| EP | 1526005 | 4/2005 |
| EP | 1621365 | 2/2006 |
| EP | 1738935 | 1/2007 |
| EP | 1808312 | 7/2007 |
| JP | 2005350595 | 12/2005 |
| JP | 2006083301 | 3/2006 |
| WO | 0160639 | 8/2001 |
| WO | 2005017020 | 2/2005 |

OTHER PUBLICATIONS

First Office Action for CN Patent Application No. 200880124801.1.
CN101072692A English Abstract.
International Search Report (Corresponding Application: PCT/US2008/088306); European Patent Office; Authorized Officer Mettler, Rolf-Martin.; Issued Aug. 3, 2009; (5 pages).
International Preliminary Report on Patentability (Corresponding Application PCT/US2008/088306); The International Bureau of WIPO; Authorized Officer Moyer, Ellen; Issued Jun. 29, 2010; (9 pages).

\* cited by examiner

*Primary Examiner* — Hui Chin
(74) *Attorney, Agent, or Firm* — Shaun J. Fox; Jenny Sheaffer

(57) ABSTRACT

Reduced hysteresis silica-containing black sidewall compounds having increased toughness properties are provided, as are methods for preparing the same. Tires comprising the black sidewall compounds prepared according to the present embodiments are also provided.

20 Claims, No Drawings

SILICA CONTAINING BLACK SIDEWALL COMPOUNDS AND TIRES COMPRISING SAME

CROSS REFERENCE TO RELATED APPLICATIONS

This application is a divisional of U.S. application Ser. No. 12/343,864 filed on Dec. 24, 2008, now U.S. Pat. No. 7,732,522 which claims priority from U.S. Provisional Patent Application No. 61/017,280, filed on Dec. 28, 2007, the disclosures of which are incorporated by reference herein in their entireties.

BACKGROUND

Rubber compositions for tire sidewalls typically include various elastomers and may be reinforced with, among other things, carbon black. Carbon black imparts such beneficial properties as abrasion resistance and electrical conductivity. For some applications, however, it may be desirable to reduce the carbon black content of the sidewall to reduce the sidewall's hysteresis. The hysteresis of a rubber composition is a measure of the rubber composition's tendency to generate internal heat under service conditions. Hysteresis is a term for heat energy expended in a material, such as, for example, a cured rubber composition, by applied work. A lower hysteretic tire sidewall rubber layer promotes lower rolling resistance, lower heat build-up for the respective tire, or both. Typically, a low "tan $\delta$" and an increase in the rubber composition's rebound value are indicative of reduced hysteresis of the rubber composition. Tan $\delta$ is a measure of the rubber composition's heat build-up.

While low hysteresis may be a desirable quality in tire sidewall compositions, reduced carbon black content may result in a lower compound modulus.

The present embodiments relate to reduced hysteresis silica-containing black sidewall compounds having increased toughness properties and methods for preparing the same. Tires comprising the black sidewall compounds prepared according to the present embodiments are also provided.

SUMMARY

In one embodiment, a composition for use in a tire sidewall is provided, the composition comprising, based on 100 parts by weight rubber (phr):
(A) elastomers comprised of:
  (1) from about 35 to about 45 phr of cis-1,4-polyisoprene natural rubber; and
  (2) from about 55 to about 65 phr of cis-polybutadiene rubber;
(B) from about 32 to about 60 phr of reinforcing filler comprised of:
  (1) from about 30 to about 50 phr of carbon black; and
  (2) from about 2 to less than 10 phr of silica; and
(C) from about 0.4 to about 1.2 phr of a silane coupling agent, wherein the amount of the silane coupling agent is from about 8% to about 24% by weight of the silica.

In another embodiment, a tire comprising a vulcanized tire sidewall component is provided, comprising: approximately 100 parts by weight of at least one tire component rubber; about 40 parts by weight of carbon black per 100 parts by weight of the tire component rubber; from about 2 to about 5 parts by weight of hydrated amorphous silica per 100 parts by weight of the tire component rubber; from about 0.4 to about 0.6 parts by weight of bis-[3-(trialkoxysilyl)-propyl]-polysulfide per 100 parts by weight of the tire component rubber, wherein the amount of the bis-[3-(trialkoxysilyl)-propyl]-polysulfide is from about 8% to about 24% by weight of the hydrated amorphous silica; from about 1.0 to about 1.2 parts by weight of N-cyclohexyl-2-benzothiazole sulfonamide or N-tert-butyl-2-benzothiazole sulfenamide per 100 parts by weight of the tire component rubber; and from about 2 to about 2.7 parts by weight of sulfur vulcanizing agent per 100 parts by weight of the tire component rubber.

In still another embodiment, an elastomer-based rubber composition is provided, comprising: elastomers; carbon black; silica having a pH of greater than about 6.5; and a silane coupling agent, present in an amount of from about 8% to about 24% by weight of the silica, wherein the carbon black and the silica are present in an aggregate amount of less than or equal to 45 parts by weight per 100 parts by weight of the elastomers.

In yet another embodiment, a method of preparing a low tan $\delta$, high toughness tire sidewall component composition is provided, the method comprising: adding to a rubber composition: carbon black in an amount of about 40 parts by weight rubber; hydrated amorphous silica in an amount of about 2 to about 5 parts by weight rubber; and a silane coupling agent in an amount of from about 8% to about 24% by weight of the hydrated amorphous silica; and curing the rubber composition. The curing may comprise curing with a sulfur vulcanizing agent and a benzothiazole accelerator, wherein the amount of the benzothiazole accelerator may be from about 30% to about 60% by weight of the sulfur vulcanizing agent.

DETAILED DESCRIPTION

The exemplary compositions generally comprise elastomers, reinforcing fillers, and a silane coupling agent. The compositions may be cured using a sulfur vulcanizing agent and various processing aids, including accelerators.

As used herein, "phr" relates to parts by weight of an ingredient per 100 parts by weight of rubber.

The terms "rubber" and "elastomer" are used interchangeably.

Exemplary Elastomers

Any conventionally used rubber compounding elastomer is potentially suitable for the exemplary compositions. Non-limiting examples of elastomers potentially useful in the exemplary composition include the following, individually as well as in combination, according to the desired final viscoelastic properties of the rubber compound: natural rubber, polyisoprene rubber, styrene butadiene rubber, polybutadiene rubber, butyl rubbers, halobutyl rubbers, ethylene propylene rubbers, crosslinked polyethylene, neoprenes, nitrile rubbers, chlorinated polyethylene rubbers, silicone rubbers, specialty heat & oil resistant rubbers, other specialty rubbers, and thermoplastic rubbers, as such terms are employed in *The Vanderbilt Rubber Handbook*, Thirteenth Edition, (1990). These elastomers may contain a variety of functional groups, including, but not limited to, tin, silicon, and amine containing functional groups.

The ratios (often expressed as adding up to 100 parts) of such polymer blends can range across the broadest possible range according to the final viscoelastic properties desired for the polymerized rubber compound. One skilled in the art, without undue experimentation, can readily determine which elastomers and in what relative amounts are appropriate for a resulting desired viscoelastic property range.

In one embodiment, the composition may include cis-1,4-polyisoprene natural rubber in the amount of from about 35 to about 45 phr and cis-1,4-butadiene rubber in the amount of from about 55 to about 65 phr. In one embodiment, the cis-1,4-butadiene rubber may be neodymium-catalyzed or nickel-catalyzed.

In one embodiment, the exemplary compositions and methods may be exclusive of a liquid hydroxyl terminated polyalkylene, a halogenated co-polymer of isobutylene and p-methylstyrene, or both. In another embodiment, the exemplary compositions and methods may be exclusive of EPDM-based rubber. In another embodiment, the exemplary compositions and methods may be exclusive of halogenated co-polymers of isoolefin and para-alkylstyrene. In another embodiment, the exemplary compositions and methods may be exclusive of styrene-butadiene rubber, including high trans styrene-butadiene rubber. In another embodiment, the exemplary compositions and methods may be exclusive of high vinyl polybutadiene elastomer.

Exemplary Reinforcing Fillers

The exemplary compositions are compounded with reinforcing fillers, including carbon black and silica. The elastomers may be compounded with all forms of carbon black. The carbon black may be present in amounts ranging from about 30 to about 50 phr, or from about 30 to about 45 phr, or from about 30 to about 40 phr. The carbon black may include any of the commonly available, commercially-produced carbon blacks. The carbon black may have a surface area (EMSA) of at least about 20 $m^2/g$.

Suitable carbon blacks may be, for example, furnace blacks, channel blacks, and lamp blacks. More specifically, examples of useful carbon blacks may include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks, and conducting channel blacks. Other suitable carbon blacks may include acetylene blacks. Representative carbon blacks may include, for example, SR730, SR630, SR530, SR511, SR401, SR315, SR310, SR303, SR301, SR155, SR140, N774, N772, N762, N660, N650, N550, N358, N351, N347, N343, N339, N330, N326, N299, N234, N231, N220, N135, N134, N121, N120, and N110. The carbon blacks may be in pelletized form or an unpelletized flocculent mass. In one embodiment, the carbon black is a N550 series carbon black, or a N660 series carbon black. In one embodiment, the carbon black has an iodine number of 60 or less, or 50 or less, or 45 or less.

Examples of suitable silica reinforcing fillers include, but are not limited to, hydrated amorphous silica, precipitated amorphous silica, wet silica (hydrated silicic acid), dry silica (anhydrous silicic acid), fumed silica, calcium silicate, and the like. Other suitable fillers include aluminum silicate, magnesium silicate, and the like. The surface area of the silicas may be from about 32 $m^2/g$ to about 400 $m^2/g$. The pH of the silica filler may generally be from about 5.5 to about 7 or slightly over.

Silica may be employed in an amount of from about 2 to about 15 phr, or from about 2 to about 10 phr, or from about 2 to about 5 phr, or about 2 to less than 5 phr. Some of the commercially available silicas which may be used include, but are not limited to, Hi-Sil® 190G, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (Piscataway, N.J.) (e.g., VN2, VN3), Rhone Poulenc (e.g., Zeosil® 11651VIP), and J M Huber Corporation (Edison, NI). In one embodiment, the silica is pretreated with a silane coupling agent.

In one embodiment, the exemplary compositions and methods may be exclusive of clay reinforcement. In another embodiment, the exemplary compositions and methods may be exclusive of amine, imide, and phenolic antidegradants. In another embodiment, the exemplary compositions and methods may be exclusive of particulate, pre-hydrophobated precipitated silica aggregates. In another embodiment, the exemplary compositions and methods may be exclusive of a starch/plasticizer composite. In another embodiment, the exemplary compositions and methods may be exclusive of dithiopropionic acid, benzoic acid, and salicylic acid.

Exemplary Silane Coupling Agents

Silica coupling agents may be used to chemically bind the silica to the rubber. Generally speaking, any conventional type of silica coupling agent may be used, such as those having a silane and a constituent component or moiety that can react with the rubber, particularly a sulfur vulcanizable rubber. The coupling agent thus acts as a connecting bridge between the silica and the rubber. The rubber reactive group of a silane coupling agent includes mercapto, polysulfide, amino, vinyl, and epoxy groups. Examples of suitable silica coupling agents include N-β-(aminoethyl)-γ-aminopropyltrimethoxysilane, γ-aminopropyltriethoxy silane, bis(β-hydroxyethyl)-γ-aminopropyltriethoxy silane, β-(3,4-epoxycyclohexyl)ethyltrimethoxy silane, γ-glycidoxypropyltrimethoxy silane, γ-methacryloxypropyltrimethoxysilane, vinyl trichlorosilane, vinyl triethoxysilane, and vinyl tris(β-methoxyethyl)silane. In general, silane coupling agents may contain a polysulfide component, or structure, such as, for example, a bis(3-alkoxysilylalkyl)polysulfide where the alkyl radicals for the alkoxy group are selected from methyl and ethyl radicals, the alkyl radical for the silane portion are selected from ethyl, propyl, and butyl radicals, and the polysulfidic bridge contains: (a) from 2 to 6, and an average of from 2.1 to 2.8, sulfur atoms; or (b) from 2 to 8, and an average of from 3.5 to 4.5, sulfur atoms. A representative example of such a coupling agent is bis-(3-triethoxysilylpropyl)-polysulfide having: (a) from 2 to 6, and an average of from 2.1 to 2.8, sulfur atoms in its polysulfidic bridge; or (b) from 2 to 8, and an average of from 3.5 to 4.5, sulfur atoms in its polysulfidic bridge. Exemplary coupling agents include bis(3-triethoxysilylpropyl)-tetrasulfide, also known as Si69®, manufactured by DeGussa AG, and bis(3-triethoxysilylpropyl)-disulfide. Other additional coupling agents include 3-octanoylthio-1-propyltriethoxy silane and mercapto-functional organosilanes. Additional suitable silane coupling agents are set forth in EP 0 857 752 B1, which is incorporated by reference herein in its entirety.

The amount of the silica coupling agent may vary, but generally is from about 8% to about 24%, or from about 10% to about 24%, by weight based upon the total weight of the silica.

Exemplary Rubber Compounding Components

The rubber composition may be compounded by, for example, mixing the various sulfur-vulcanizable constituent rubbers with various commonly used additive materials such as, for example, curing aids such as sulfur, activators, retarders, and accelerators, processing additives, such as oils, resins including tackifying resins, silicas, and plasticizers, fillers, pigments, fatty acid, zinc oxide, waxes, antioxidants and antiozonants, peptizing agents, and reinforcing materials such as, for example, carbon black.

An amount of processing aids may be from about zero to about 10 phr. Such processing aids may include, for example, aromatic, naphthenic, and/or paraffinic processing oils. Typical amounts of antioxidants may comprise from about 1 to about 5 phr. Representative antioxidants may be, for example, diphenyl-p-phenylenediamine, TMQ, and others such as, for example, those disclosed in *The Vanderbilt Rubber Handbook* (1978), pages 344-346. Typical amounts of antiozonants, such as N-(1,3-dimethylbutyl)-N'-phenyl-1,4-benzene diamine (6PPD), may comprise from about 1 to 5 phr. Typical amounts of fatty acids, if used, which can include stearic acid, may comprise from about 0.5 to about 3 phr. Typical amounts of zinc oxide may comprise from about 1 to about 5 phr. Typical amounts of waxes may comprise from about 1 to about 5 phr. Often microcrystalline waxes are used. Typical amounts of peptizers may comprise from about 0.1 to about 1 phr. Typical peptizers may be, for example, pentachlorothiophenol and dibenzamidodiphenyl disulfide. Process aids, such as phenolic resin (about 2 phr) and C5 aliphatic HC resin (about 5 phr) (tackifiers) may also be useful.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide, or sulfur olefin adducts. Sulfur vulcanizing agents may be used in an amount ranging from about 0.5 to about 8 phr.

Accelerators are used to control the time and/or temperature required for vulcanization and to improve the properties of the vulcanizate. In one embodiment, a single accelerator system may be used, i.e., a primary accelerator. A primary accelerator is used in total amounts ranging from about 0.5 to about 4 phr. In another embodiment, combinations of a primary and a secondary accelerator might be used with the secondary accelerator being used in smaller amounts (of about 0.05 to about 3 phr) in order to activate and to improve the properties of the vulcanizate. In addition, delayed action accelerators may be used which are not affected by normal processing temperatures, but produce a satisfactory cure at ordinary vulcanization temperatures. Vulcanization retarders might also be used. Suitable types of accelerators that may be used are amines, disulfides, guanidines, thioureas, thiurams, sulfonamides, dithiocarbamates, xanthates, and sulfenamides. The primary accelerator may also be a thiazole, such as a benzothiazole-based accelerator. Exemplary benzothiazole-based accelerators may include N-cyclohexyl-2-benzothiazole sulfonamide (CBS), N-tert-butyl-2-benzothiazole sulfenamide (TBBS), 4-oxydiethylene-2-benzothiazole sulfenamide (OBTS), N,N'-dicyclohexyll-2-benzothiazole sulfenamide (OCBS), 2-mercaptobenzothiazole (MBT), and dibenzothiazole disulfide (MBTS), and may be present in an amount of from about 0.8 to about 1.2 parts by weight of per 100 parts by weight of the tire component rubber. In one embodiment, the amount of the benzothiazole accelerator may be from about 30% to about 60% by weight of the sulfur vulcanizing agent.

In one exemplary embodiment, a composition for use in a tire sidewall is provided, the composition comprising, based on 100 parts by weight rubber (phr):
 (A) elastomers comprised of:
  (1) from about 35 to about 45 phr of cis-1,4-polyisoprene natural rubber; and
  (2) from about 55 to about 65 phr of cis-polybutadiene rubber;

(B) from about 32 to about 60 phr of reinforcing filler comprised of:
 (1) from about 30 to about 50 phr of carbon black; and
 (2) from about 2 to less than 10 phr of silica; and
(C) from about 0.4 to about 1.2 phr of a silane coupling agent, wherein the amount of the silane coupling agent is from about 8% to about 24% by weight of the silica.

The composition may further comprise from about 0.5 to about 4 phr of a sulfur vulcanizing agent and from about 0.8 to about 1.2 phr of a benzothiazole accelerator, wherein the amount of the benzothiazole accelerator may be from about 30% to about 60% by weight of the sulfur vulcanizing agent. In one embodiment, the sulfur vulcanizing agent may be present in an amount of from about 2 to about 2.7 phr and the benzothiazole accelerator may be present in the amount of from about 1.0 to about 1.2 phr.

In one embodiment, the cis-1,4-polyisoprene natural rubber is present in the amount of about 35 phr and the cis-1,4-butadiene rubber is present in the amount of about 65 phr. In another embodiment, the cis-1,4-butadiene rubber may be neodymium-catalyzed or nickel-catalyzed. In one embodiment, the carbon black is present in the amount of about 40 phr and the hydrated amorphous silica is present in the amount of from about 2 to about 5 phr. In one embodiment, the benzothiazole is selected from one or more of N-cyclohexyl-2-benzothiazole sulfonamide and N-tert-butyl-2-benzothiazole sulfenamide. In one embodiment, the silane coupling agent is bis-[3-(triethoxysilyl)-propyl]-disulfide. In one embodiment, the hydrated amorphous silica has a pH of greater than about 6. In another embodiment, the sum of the components comprising the reinforcing filler is less than or equal to 45 phr. In one embodiment, the carbon black has an iodine value of about 43 and a dibutylphthalate value of about 121. In one embodiment, the hydrated amorphous silica has a BET surface area of about 200 m$^2$/g. A tire is also provided, the tire having at least a portion of a sidewall as the exemplary composition.

In another embodiment, a tire is provided, the tire comprising a vulcanized tire sidewall component, comprising: approximately 100 parts by weight of at least one tire component rubber; about 40 parts by weight of carbon black per 100 parts by weight of the tire component rubber; from about 2 to about 5 parts by weight of hydrated amorphous silica per 100 parts by weight of the tire component rubber; from about 0.4 to about 0.6 parts by weight of bis-[3-(trialkoxysilyl)-propyl]-polysulfide per 100 parts by weight of the tire component rubber, wherein the amount of the bis-[3-(trialkoxysilyl)-propyl]-polysulfide is from about 8% to about 24% by weight of the hydrated amorphous silica; from about 1.0 to about 1.2 parts by weight of N-cyclohexyl-2-benzothiazole sulfonamide or N-tert-butyl-2-benzothiazole sulfenamide per 100 parts by weight of the tire component rubber; and from about 2 to about 2.7 parts by weight of sulfur vulcanizing agent per 100 parts by weight of the tire component rubber.

In an alternative embodiment, an elastomer-based rubber composition is provided, comprising: elastomers; carbon black; hydrated amorphous silica having a pH of greater than about 6; and a silane coupling agent, present in an amount of from about 8% to about 24% by weight of the hydrated amorphous silica, wherein the carbon black and the hydrated amorphous silica are present in a combined amount of less than or equal to 45 parts by weight per 100 parts of weight of the elastomers. The composition may also include a sulfur vulcanizing agent and a benzothiazole accelerator. The benzothiazole accelerator may be present in an amount of from about 30% to about 60% by weight of the sulfur vulcanizing agent. A tire is also provided having at least a portion of a sidewall as the exemplary composition.

A method is also provided for preparing a low tan δ, high toughness tire sidewall component composition, the method comprising: adding to a rubber composition: carbon black in an amount of about 40 parts by weight rubber; hydrated amorphous silica in an amount of about 2 to about 5 parts by weight rubber; and a silane coupling agent in an amount of from about 8% to about 24% by weight of the hydrated amorphous silica; and curing the rubber composition. In the exemplary method, the curing may comprise curing with a sulfur vulcanizing agent and a benzothiazole accelerator, wherein the amount of the benzothiazole accelerator may be from about 30% to about 60% by weight of the sulfur vulcanizing agent.

EXAMPLES

Examples 1-4 and Comparative Examples A and B

Rubber compounds containing varying amounts and ratios of silica and silane coupling agent were compared to rubber compounds without such components.

Comparative Examples A and B are representative of carbon black-filled sidewall compositions. More specifically, Comparative Example A is a control sample, having a relatively high carbon black content (55 phr) and no silica or silane coupling agent. Comparative Example B is a second control sample, having a carbon black content equal to Examples 1-4 (40 phr), but having no silica or silane coupling agent. Examples 1-4 are modified versions of Comparative Examples A and B, each containing from 5 to 15 of phr silica and from 0.4 to 1.2 phr of silane coupling agent.

The compositions were mixed in two stages. For the first non-productive mix stage, the ingredients were mixed for approximately 120 seconds to a temperature of about 155° C. The resulting rubber composition was mixed with sulfur curatives and accelerators to a maximum temperature of 77° C. for about 145 seconds in a final, productive mix stage.

Table 1 contains the formulations for each of Comparative Examples A and B and Examples 1-4.

TABLE 1

| Materials | Comp. A | Comp. B | Ex. 1 | Ex. 2 | Ex. 3 | Ex. 4 |
|---|---|---|---|---|---|---|
| Masterbatch | | | | | | |
| Natural Rubber | 35 | 35 | 35 | 35 | 35 | 35 |
| Nd-BR | | 65 | 65 | 65 | 65 | 65 |
| Ni-BR | 65 | | | | | |
| N550 Carbon Black | 55 | 40 | 40 | 40 | 40 | 40 |
| Processing Aids | 10.5 | 10.5 | 10.5 | 10.5 | 10.5 | 10.5 |
| Stearic Acid | 1.5 | 1.5 | 1.5 | 1.5 | 1.5 | 1.5 |
| Antidegradants | 6.5 | 6.5 | 6.5 | 6.5 | 6.5 | 6.5 |
| French Zinc Oxide | 2.5 | 2.5 | 2.5 | 2.5 | 2.5 | 2.5 |
| Tackifying Resins | 7 | 7 | 7 | 7 | 7 | 7 |
| Silica | | | 5 | 5 | 10 | 15 |
| bis-[3-(triethoxysilyl)-propyl]-disulfide | | | 0.4 | 0.6 | 0.8 | 1.2 |
| Final | | | | | | |
| Curatives | 2.9 | 3.1 | 3.1 | 3.1 | 3.1 | 3.1 |

Samples of each of these compounds were vulcanized at a temperature of about 149° C. for about 40 minutes. Selected physical properties for the resulting vulcanized rubber compositions are shown in Table 2. Tan δ values were obtained by a viscoelastic tester using a specimen having a width of 4.7 mm and a chuck-to-chuck distance of 10 mm (length of specimen between the chucks). The viscoelastic tester placed an initial strain on the specimen of 150 µm, and was operated at a frequency of 52 Hz and 1% strain. The tensile properties, such as modulus, tensile break, and elongation at break were obtained using the standard procedure described in ASTM-D412.

TABLE 2

| Physical Property | Comp. A | Comp. B | Ex. 1 | Ex. 2 | Ex. 3 | Ex. 4 |
|---|---|---|---|---|---|---|
| Tan δ | | | | | | |
| Tan δ @ 60° C. 1% Stress/Strain | 0.162 | 0.087 | 0.101 | 0.096 | 0.099 | 0.098 |
| M100 @ RT (Mpa) | 1.6 | 1.5 | 1.5 | 1.6 | 1.6 | 1.6 |
| M300 @ RT (Mpa) | 7.1 | 6.1 | 6.1 | 6.6 | 6.8 | 6.8 |
| M100 @ 100° C. (Mpa) | 1.6 | 1.7 | 1.6 | 1.6 | 1.7 | 1.7 |
| M300 @ 100° C. (Mpa) | 5.7 | | 5.7 | 5.7 | 5.8 | 6.1 |
| TB @ RT (Mpa) | 13.8 | 10.0 | 13.4 | 13.2 | 13.7 | 14.0 |
| EB @ RT (%) | 506 | 418 | 530 | 492 | 501 | 494 |
| $TB_{RT} \times EB_{RT}$ | 6962 | 4173 | 7121 | 6495 | 6875 | 6898 |
| TB @ 100° C. (Mpa) | 8.8 | 5.3 | 6.9 | 7.0 | 7.6 | 7.7 |
| EB @ 100° C. (%) | 448 | 282 | 354 | 357 | 379 | 371 |
| $TB_{100° C.} \times EB_{100° C.}$ | 3928 | 1502 | 2452 | 2501 | 2899 | 2854 |
| Zwick Rebound % | | | | | | |
| RT | 58.7 | 71.2 | 67.8 | 67.8 | 67.7 | 68.2 |
| 66° C. | 64.0 | 75.8 | 73.0 | 72.8 | 73.2 | 73.4 |
| 100° C. | 67.0 | 78.0 | 75.4 | 75.4 | 75.4 | 75.6 |
| Durometer Shore A | | | | | | |
| RT | 49.5 | 50.1 | 50.3 | 50.0 | 50.6 | 50.5 |
| 66° C. | 47.7 | 49.1 | 48.6 | 48.8 | 49.2 | 49.1 |
| 100° C. | 47.6 | 50.1 | 50.0 | 49.8 | 50.2 | 50.4 |
| Rheometer | | | | | | |
| ML (Lbs Inches) | 1.33 | 1.07 | 1.22 | 1.21 | 1.23 | 1.28 |

TABLE 2-continued

| Physical Property | Comp. A | Comp. B | Ex. 1 | Ex. 2 | Ex. 3 | Ex. 4 |
|---|---|---|---|---|---|---|
| MH (Lbs Inches) | 9.66 | 11.26 | 10.98 | 11.18 | 11.34 | 11.43 |
| Ts1 | 2.84 | 3.02 | 2.75 | 2.70 | 2.62 | 2.67 |
| Ts2 | 3.28 | 3.48 | 3.24 | 3.17 | 3.06 | 3.08 |
| $t_{10}$ (min) | 2.71 | 3.03 | 2.72 | 2.70 | 2.63 | 2.67 |
| $T_{50}$ (min) | 3.96 | 4.05 | 3.86 | 3.78 | 3.66 | 3.67 |
| $T_{90}$ (min) | 6.38 | 5.79 | 5.83 | 5.57 | 5.44 | 5.44 |
| Tan δ @ ML | 0.669 | 0.785 | 0.779 | 0.777 | 0.764 | 0.742 |
| Tan δ @ MH | 0.059 | 0.020 | 0.027 | 0.027 | 0.026 | 0.026 |

As may be seen from the data contained in Table 2, the physical properties of the black sidewall compound are affected by the presence and relative amounts of silica and silane coupling agent. Comparative Example A is predictably found to have a relatively high tan δ value, indicating a relatively high hysteresis. Comparative Example B is predictably found to have reduced hysteresis, but also has reduced toughness characteristics. Each of Examples 1-4 exhibit the expected decrease in tan δ value in comparison to Comparative Example A, indicating a reduced hysteresis. Each of Examples 1-4 also showed increased toughness properties over Comparative Example B.

It is, of course, not possible to describe every conceivable combination of components or methodologies for purposes of describing the compositions, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicants' general inventive concept. A person of ordinary skill will readily recognize that optimizing or manipulating any one of these variables may or will require or make possible the manipulation of one or more of the other of these variables, and that any such optimization or manipulation is within the spirit and scope of the present embodiments.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the compositions, methods, and so on have been illustrated by describing examples, and while the examples have been described in considerable detail, it is not the intention of the applicant to restrict, or in any way, limit the scope of the appended claims to such detail. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A tire sidewall, comprising: elastomers; carbon black; hydrated amorphous silica having a pH of greater than about 6.5; and a silane coupling agent, present in an amount of from about 8% to about 24% by weight of the hydrated amorphous silica; wherein the elastomers comprise no more than about 45 phr of natural rubber, and wherein the carbon black and the hydrated amorphous silica are present: (i) in a ratio of at least about 4 parts by weight carbon black to 1 part by weight silica; and (ii) in an aggregate amount of less than or equal to 45 parts by weight per 100 parts by weight of the elastomers.

2. The tire sidewall of claim 1, further comprising: a sulfur vulcanizing agent; and a benzothiazole accelerator, present in an amount of from 30% to 60% by weight of the sulfur vulcanizing agent.

3. A tire having at least a portion of the tire sidewall of claim 1.

4. A tire sidewall as claimed in claim 1 wherein the amount of the silane coupling agent is about 10% to 24% by weight of the silica.

5. A tire sidewall as claimed in claim 1 wherein the carbon black is selected from at least one of N550 or N660 grade carbon black.

6. A tire sidewall as claimed in claim 1 wherein the carbon black has an iodine value of less than about 50.

7. A tire sidewall as claimed in claim 1 wherein the silica has a BET surface area of about 200 $m^2/g$.

8. A tire according to claim 3, wherein said tire sidewall comprises about 40 parts by weight of carbon black per 100 parts by weight of elastomers, from 2 to 5 parts by weight of hydrated amorphous silica per 100 parts by weight of the elastomers, and said tire sidewall further comprises (a) about 0.4 to about 0.6 parts by weight of bis-[3-(trialkoxysilyl)-propyl]polysulfide per 100 parts by weight of elastomers and the amount of the bis-[3-(trialkoxysilyl)-propyl]-polysulfide is from about 8% to about 24% by weight of the hydrated amorphous silica; (b) about 1.0 to about 1.2 parts by weight of N-cyclohexyl-2-benzothiazole sulfonamide or N-tert-butyl-2-benzothiazole sulfenamide per 100 parts by weight of elastomers; and (c) from about 2 to about 2.7 parts by weight of sulfur vulcanizing agent per 100 parts by weight of elastomers.

9. A tire sidewall, comprising: elastomers; carbon black; hydrated amorphous silica having a pH of greater than about 6.5; and a silane coupling agent, present in an amount of from about 8% to about 24% by weight of the hydrated amorphous silica; wherein the elastomers comprise no more than about 45 phr of natural rubber, and wherein the carbon black and the hydrated amorphous silica are present: (i) in an amount of about 4:1 to about 21½:1 parts by weight carbon black to silica; and (ii) in an aggregate amount of less than or equal to 45 parts by weight per 100 parts by weight of the elastomers.

10. The tire sidewall of claim 9, wherein the carbon black and the hydrated amorphous silica are present in an amount of about 4:1 to about 8:1 parts by weight carbon black to silica.

11. The tire sidewall of claim 9, further comprising: a sulfur vulcanizing agent; and a benzothiazole accelerator, present in an amount of from 30% to 60% by weight of the sulfur vulcanizing agent.

12. A tire having at least a portion of the sidewall of claim 9.

13. A tire according to claim 12, wherein said tire sidewall comprises about 40 parts by weight of carbon black per 100 parts by weight of elastomers, from 2 to 5 parts by weight of hydrated amorphous silica per 100 parts by weight of the elastomers, and said rubber composition tire sidewall further comprises (a) about 0.4 to about 0.6 parts by weight of bis-[3-(trialkoxysilyl)-propyl]-polysulfide per 100 parts by weight of elastomers and the amount of the bis-[3-(trialkoxysilyl)-propyl]-polysulfide is from about 8% to about 24% by weight of the hydrated amorphous silica; (b) about 1.0 to about 1.2 parts by weight of N-cyclohexyl-2-benzothiazole sulfenamide or N-tert-butyl-2-benzothiazole sulfonamide per 100 parts by weight of elastomers; and (c) from about 2 to about 2.7 parts by weight of sulfur vulcanizing agent per 100 parts by weight of elastomers.

14. A tire sidewall, comprising: elastomers; carbon black; hydrated amorphous silica having a pH of greater than about 6.5; and a silane coupling agent, present in an amount of from about 8% to about 24% by weight of the hydrated amorphous silica; wherein the elastomers comprise no more than about 45 phr of natural rubber, and wherein the carbon black and the hydrated amorphous silica are present: (1) in an amount of about 4:1 to about 8:1 parts by weight carbon black to silica; and (ii) in an aggregate amount of less than or equal to 45 parts by weight per 100 parts by weight of the elastomers.

15. The tire sidewall of claim 14, further comprising: a sulfur vulcanizing agent; and a benzothiazole accelerator, present in an amount of from 30% to 60% by weight of the sulfur vulcanizing agent.

16. A tire having at least a portion of the sidewall of claim 14.

17. A tire sidewall as claimed in claim 14 wherein the amount of the silane coupling agent is about 10% to 24% by weight of the silica.

18. A tire sidewall as claimed in claim 14 wherein the carbon black is selected from at least one of N550 or N660 grade carbon black.

19. A tire sidewall as claimed in claim 14 wherein the carbon black has an iodine value of less than about 50.

20. A tire according to claim 16, wherein said tire sidewall comprises about 40 parts by weight of carbon black per 100 parts by weight of elastomers, from 2 to 5 parts by weight of hydrated amorphous silica per 100 parts by weight of the elastomers, and said tire sidewall further comprises (a) about 0.4 to about 0.6 parts by weight of bis-[3-(trialkoxysilyl)-propyl]-polysulfide per 100 parts by weight of elastomers and the amount of the bis-[3-(trialkoxysilyl)-propyl]-polysulfide is from about 8% to about 24% by weight of the hydrated amorphous silica; (b) about 1.0 to about 1.2 parts by weight of N-cyclohexyl-2-benzothiazole sulfonamide or N-tert-butyl-2-benzothiazole sulfenamide per 100 parts by weight of elastomers; and (c) from about 2 to about 2.7 parts by weight of sulfur vulcanizing agent per 100 parts by weight of elastomers.

* * * * *